3,242,219
PREPARATION OF BISPHENOLS
Alford G. Farnham, Mendham, Francis N. Apel, Nutley, and Howard L. Bender, Bloomfield, N.J., assignors to Union Carbide Corporation, a corporation of New York
No Drawing. Filed Dec. 31, 1957, Ser. No. 706,295
3 Claims. (Cl. 260—619)

This invention relates to the preparation of 2,2-bis(4-hydroxyphenyl)propane and other bisphenols made by reaction of ketones with phenols. More specifically, it relates to the use of a specially conditioned polymeric catalyst in preparing bisphenols, particularly 2,2-bis(4-hydroxyphenyl)propane from phenol and acetone.

Many methods have been proposed heretofore for the preparation of 2,2-bis(4-hydroxyphenyl)propane, more commonly known as bisphenol-A, by the condensation of phenol and acetone. Suitable methods for commercial application, and the most commonly employed, utilizes strong mineral acids such as sulfuric or hydrochloric acid to serve as a soluble catalyst or condensing agent for the reaction. Water is a by-product in this reaction and in the presence of such soluble and dehydrating acids creates problems, which although not unsurmountable, are expensive and sometimes difficult to live with. Not only does water in the soluble acid adversely affect the rate of reaction to decrease yields, but it also dilutes the acid catalyst making it necessary to reconcentrate or to discard the acid. The soluble acid comes in contact with all metal which contacts the reaction mixture, thus extensive and costly corrosion resistant equipment is necessary which reflects back on the cost of the 2,2-bis(4-hydroxyphenyl)propane produced. In addition, the use of such soluble acids in the product steam fosters the production of undesired by-products, contaminating the bisphenol with by-products and metal salts unless extensive purification steps are employed. Most of these purification steps to separate out unreacted phenol generally must be conducted below 150° C. if even traces of soluble acids are present, so that distillation, if used, becomes an expensive high vacuum process.

We have now discovered a highly desirable and satisfactory process for the production of bisphenols which minimizes or avoids the difficulties in the heretofore known processes. According to our invention, it has now been found that the condensation of phenols and ketones to produce bisphenols can be accomplished by the use of a substantially insoluble cationic exchanging polymeric resin. Basically these catalysts are polymeric resins having chemically bound thereto cationic exchanging groups. Generally these ionic exchanging groups such as sulfonic acid groups exhibiting strong exchange potential with basic ions, such as $Na^+$ and $Ca^{++}$.

This catalyst is chemically stable and substantially insoluble in the reaction mixture at reaction temperatures up to about 100° C. While its effectiveness is to a degree affected by the water formed in the reaction, the reaction can be conducted until the water content builds up to a point that the reaction ceases, and then the products recovered and the catalyst regenerated. Similarly, its use does not foster the production of by-products which are not reaction intermediates in the formation of bisphenols, thereby simplifying the purification process.

The exchange capacity of these ion exchanging resins is determined essentially by the number of acidic groups attached to the polymeric resin skeleton per unit weight. However, the catalytic effectiveness of the resin in this process is only partly determined by its exchange capacity. Of equal importance is the availability of these acidic groups to contact with the reactants.

Thus to be effective in this process, the acid groups must be on the surface of the resin structure. It is not necessary, however, that the resin structure be in any particular form, although it is desirable to achieve the greatest possible surface area in the catalyst for exposure of the greatest number of acid groups. Thus the catalyst structure is advantageously made as fine as possible for instance in microspheres or beads to increase total surface area, or it can be made porous. Where porous polymeric structures are employed, the pores should preferably be large enough to permit free passage to large organic molecules such as the bisphenols.

The particular polymeric structure to which these strong acid groups are attached is not critical in this process. It should be such, however, as to render the polymeric structure substantially insoluble in the reaction mixture and in any solvent to which the catalyst might normally be exposed. Highly cross-linked resins effectively provide the insolubility feature required of these resins, although other means, such as crystallization forces, sometimes become powerful enough to insure insolubility without actual cross-linking. Highly successful results have been secured with styrene-divinylbenzene sulfonated resins, sulfonated cross-linked styrene polymers phenol-formaldehyde sulfonic acid resins, benzene-formaldehyde-sulfonic acid resins, and the like. Such resins have been sold and marketed by several companies under various brand names. For instance, Rohm & Haas Co.'s Amberlite XE–100, a sulfonated styrene-divinylbenzene resin is highly successful in this process, as are other sulfonated ion exchanging resins such as Dow Chemical Co.'s Dowex-50-X, Permutit Co.'s Permutit QH, and Chemical Process Co.'s Chempro C–20.

It is generally necessary for this process that the cationic exchange resins be in the acid or hydrogen form. Some of these resins while marketed in the salt or sodium form must necessarily be treated before use to convert the ion exchange groups to the acid form. Generally this can be easily performed on the sulfonated resins with sulfuric acid. An excess of acid is generally used and after regeneration, the excess acid is washed out with water or suitable solvent to remove the released salts.

In such treatment, water, if employed, disperses within and to some extent swells the resin network. It is also possible for the resin to be sold wetted with water to the same effect. It has been found that the presence of such water within the polymeric network of the ionic exchange resin has a rather striking and deleterious effect on the effectiveness of the catalyst. A water-wet resin, for instance, may contain up to an equal weight of water on the dry resin weight. This water should for best results be displaced, leaving under about one percent by residue weight on the resin in order to exhibit maximum rate in the condensation of ketonic groups with phenol. The resin salts can, of course, be acidified in organic solvents containing soluble acids but this develops into a difficult problem of washing free of by-product salts by means of an organic system.

Displacement of the water can be accomplished in several ways other than by organic neutralizing and washing mediums. For instance, the water can be displaced by phenol through distillation or diffusion techniques, or the resin can be dried in an oven or under vacuum. A dried resin which is allowed to soak for a time in melted phenol when in the acid state forms a very effective catalyst to condense the phenol and ketone employed in this process. Without a displacement of most of such water, the polymeric resin acids exhibit only poor catalytic effect. Without desiring to be bound by any particular theory of operation, it is believed that the water within the framework of the polymeric catalyst forms an effective shield around the ionic groups attached to the resin structure and prevents or retards the catalytic effect of these groups in the non-aqueous reaction media. Replacement of this partly bonded water wtih phenol tremendously increases the availability of these acidic ionic groups to such an extent that the modified resin then becomes a highly effective catalyst for the phenol-ketone reaction.

Inasmuch as no free acid is released in the reaction with these polymeric catalysts, no serious corrosion or catalyst dilution problems are incurred because of the water released in this process. The catalyst effectiveness is, however, to some degree affected by the water formed in the reaction, particularly if the water content in the reaction mixture rises to about two percent or more. Best operation under batch techniques is secured by conducting the reaction until the water content of the mixture reaches about 1.5% by weight of the reaction mixture. After once being prepared for reaction by removal of water and the use of salt free and dry phenol-ketone feed liquor, the catalyst can be effective for long periods of use. For maximum effectiveness, however, it is desirable to redry the catalyst. Metallic salts may also decrease the effectiveness of the catalyst so that it then may require regeneration by an acid wash.

Such catalysts are effective in promoting the condensation of phenols having a reactive and substantially unhindered hydrogen in the para position to the phenolic hydroxyl. Such phenols may have one or more lower alkyl substituents, which are in the ortho and meta positions to the phenolic hydroxyl, for instance ortho and meta cresol, 2,6-dimethylphenol, metaxylenol, tetramethylphenol, 2-methyl, 6-tertbutylphenol, and like phenols, or halogen substituted phenols, particularly ortho and meta chlorophenol, 2,6-dichlorophenol and like halogenated phenols.

It is necessary in the process of this invention to operate with more than stoichiometric amounts of the phenol to ketone in the reaction zone, and generally with at least 3 moles of phenol per mole of ketone. In the acetone-phenol reaction, for instance, the phenol to acetone molar ratio is preferably between 3:1 and 20:1. It has been observed, however, that at mole ratio of about 6:1 to 12:1 of phenol to acetone in a continuous process, a somewhat higher conversion per pass and slightly better acetone efficiency is achieved. Ketones having at least one methyl group alpha to the carbonyl can be used with the catalyst of this invention. Particularly desirable is acetone, although other ketones having aromatic or aliphatic hydrocarbon groups alpha to the carbonyl such as methyl ethyl ketone, methyl propyl ketone, acetophenone (methylphenyl ketone), methyl vinyl ketone, and the like can be used. Cyclic ketones, e.g., cyclohexanone can also be used.

The reaction of phenol and acetone to the 2,2-bis (4-hydroxyphenyl) propane or other phenols and ketones to corresponding bisphenols can be accomplished by the use of this catalyst in a batchwise manner by the addition of the ketone and phenol to the prepared catalyst, and maintaining the desired reaction temperature until the water content inactivates the catalyst, or significantly reduces the reaction rate. After the ketone has been entirely or partly reacted to bisphenol, the product can be recovered by filtering off the insoluble ion exchanging resin and recovering the product. In continuous operation, the phenol-ketone mixture can be passed through a fixed or moving bed of catalyst at a rate such that the water content in the reaction phase is controlled within the tolerable limits. If desired, several stationary beds can be employed to continuously remove and regenerate or dehydrate a portion of the catalyst and return it to the reaction zone.

We have found that these ion exchange resins in the acid form are generally effective at moderate elevated temperatures of about 40° C. to about 100° C. Temperatures exceeding 100° C. are not necessary or particularly desirable since the by-product formation seems to rapidly increase above this temperature without a concomitant increase in the bisphenol reaction rate or yield. In addition, some dissolution of the resin can result at temperatures somewhat above 100° C. However, the working temperature in this system is considerably higher than allowable when using liquid acids like sulfuric where by-product production becomes very serious even at 65° C.

With solid polymeric resins containing fixed strongly acid groups, preferably operating temperatures of about 65° C. to 95° C. are employed. It has been observed that reaction rate increases with an increase in temperature but at the same time by-product formation may also be increased. At temperatures much above 100° C. the amount of by-product formation (color bodies and resins) is also serious enough to significantly affect the yield of bisphenol and to make its separation from the by-product difficult. Reaction temperatures above 150° C. are unsatisfactory from all aspects and should be avoided.

In continuous column operations temperatures between 70° C. and 98° C. are most satisfactory. At below 65° C. operation at high conversion is difficult to control in the phenol-acetone reaction without plugging of the column or crystallization of phenol complex within the system. However, in batch operation, temperatures as low as 40° C. can be employed.

Operation pressures do not appear to have a critical effect on the operation of this process. While atmospheric pressure appears generally to be most convenient, increased pressure may be highly desirable. Reduced pressures can also be used if desired. In column operation, it is functionally necessary to employ a somewhat greater pressure at the inlet to overcome the pressure drop within the column itself caused by the flow resistance of a tightly packed bed.

In reactions conducted at a temperature below 100° C., residence time of the phenol and ketone to the action of the catalyst is not necessarily critical under batch operation. The bisphenol product is generally not changed by prolonged contact with the catalsyt. Phenol, acetone, and bisphenol-A for instance and limited amounts of water can be in contact with phenol saturated catalyst for extended times to give an economically desirable amount of 2,2-bis(4-hydroxyphenyl)propane for recovery. Unseparated reactants after dehydration may go back through the process. Generally speaking, at reaction temperature from about 50° C. to 100° C. the most desirable contact time is dependent principally upon the amount of polymeric catalyst, its acidity, condition or porosity, and exchange capacity, and the specific amount of reactants and water formed in the reaction. With equal exchange capacity and porosity some batches of catalyst respond better so that in the final analysis the most desirable catalysts for use in the particular process are chosen by test runs of sufficient length to indicate the approximate production of pounds of bisphenol produced per pound catalyst to reach a stable production level.

In the use of such catalyst for a batch process, an initially dry phenol-saturated catalyst in a dry feed liquor will produce at complete conversion about a pound of bisphenol per pound of dry catalyst before the contained water becomes troublesome. The catalyst can then be filtered off, washed and dried, suspended in dry phenol and ready for reuse. Such a cycle can be continued indefinitely unless traces of alkalies or metal ions in the system act to block the fixed acid groups on the catalyst. The inactivated catalyst then may be regenerated if desired by acid, washed, dried and again treated with phenol to be ready for reuse. Excessive attrition and high heat should be avoided in such regeneration.

In a fixed bed column operation under continuous or semi-continuous operations, the ratio of acid equivalents of catalyst to mols of ketone is fixed by the ratio of exchange capacity to the bulk density and porosity of the resin. The flow rate of reactants must be adjusted commensurate with the desired ketone conversion percent desired on each cycle. Generally, we prefer to operate the continuous system to obtain a sufficient residence time in the column to secure an acetone conversion of about 50 percent or more per cycle. However, if desired, the continuous system can be operated at any desired acetone conversion rate per pass depending on the economy in the process.

Recovery of the product in this process is relatively easy and can be done by any of several methods. In batch operation, a suitable method for separation of bisphenol-A appears to be a crystallization of the phenol-bisphenol-A complex after the removal of the insoluble polymer catalyst. The original catalyst or fine particles therefrom can be removed by filtering the reaction mixture at a temperature above the crystallization temperature of the phenol-bisphenol-A complex, for instance about 65° C. and cooling the filtrate to precipitate the complex, such as at about 40° C. to 65° C. and recovering the purified crystals of the phenol-bisphenol-A complex. This complex can then be distilled to residue bisphenol A, giving a dry phenol distillate for recycle. The residue bisphenol A is generally of very good commercial quality, quite often of a purity of 95 percent or better. Other bisphenols produced in this process can be separated from unreacted ketone and phenol by crystallization or precipitation techniques. While some dissolved bisphenol and most by-products may remain in the filtrate of this separation, distillation, or other suitable means to recover the bisphenol and the phenol for reuse can be employed.

The following examples are illustrative.

Example 1

Phenol and acetone were mixed together in a molar ratio of 10 mols phenol per mol of acetone and pumped by a Zenith metering pump through a 100 inch long by 1 inch I.D. glass column packed with 1046 grams of phenol-wet catalyst composed of 728 grams dry weight of cation exchange resin containing 318 grams of phenol. The catalyst employed was a sulfonated styrene-divinyl benzene polymer having 5 meq of acid per gram (sold under the name of Amberlite XE–100 by the Rohm and Haas Co.) which had been converted to the acid form by treatment with about 10 meg. of sulfuric acid, followed by washing with water until all free acid was removed, and the remaining water displaced with phenol by azeotropic distillation. The distillation was conducted by adding 2000 grams of phenol to the washed ion exchange resin and the mixture heated to 95° C. for one hour at 20 mm. Hg pressure to distill off the water together with an azeotrope of water with phenol.

The phenol saturated column was maintained at a temperature of 75° C. ±0.5° and operated continuously for 14 hours, with the flow rate of nearly dry phenol and acetone being maintained between about 630 and 650 grams per hour except for the first three hours when it was 734, 703, and 678 grams per hour respectively for each of the three hours. Samples were taken at three stages of operation. Sample A was the effluent for the first and second hours and amounted to 1437 grams; Sample B was the effluent for the fifth and sixth hours and amounted to 1247 grams; and Sample C was the effluent for the thirteenth and fourteenth hours and amounted to 1288 grams.

Each of the samples was processed in the same way. The sample was cooled with agitation to 27° C. to precipitate some of the phenol and 2,2-bis(4-hydroxyphenyl)propane complex along with the phenol, and filtered by use of a coarse sintered glass funnel. The filter cake was pressed and sucked dry at 15–20 mm. Hg pressure and weighed. The recovered crystalline material from Sample A weighed 338 grams; that from Sample B weighed 208 grams; and that from Sample C weighed 247 grams.

The filter cake was washed with a total of about 150 ml. of distilled water to wash out free phenol in several portions and sucked dry with vacuum as above. The dried filter cake was distilled to a pot temperature of 200° C. at 0.2 mm. Hg pressure, the residue yielding 2,2-bis(4-hydroxyphenol)propane in amounts of 110 grams, 63 grams and 60 grams respectively for Samples A, B, nd C. The recovered 2,2-bis(4-hydroxyphenol)propane from these samples was high in purity and free from resinous by-products. It had a melting point within the range of 155° C. to 157° C.

The wash water used to wash the filter cake was placed in a separatory funnel and separated into aqueous and oil layers. The oil layer of mostly phenol was distilled to a pot temperature of 200° C. at 0.2 mm. Hg pressure and there was recovered an additional amount of the 2,2-bis(4-hydroxyphenyl)propane from the residue of 15 grams, 9.5 grams, and 13.5 grams respectively for Samples A, B, and C.

The mother liquor from the first filtration was distilled to a pot temperature of 200° C. at 0.2 mm. Hg pressure after removing a small sample for acetone determination. An aliquot of the distillation residue was recrystallized from an equal weight of toluene and the crystalline 2,2-bis(4-hydroxyphenyl)propane recovered and dried. The weight of this product in the total mother liquor was then calculated as 42 grams, 49 grams, and 53 grams of 2,2-bis(4-hydroxyphenyl)propane in Samples A, B, and C, respectively.

The following table represents the summary of the three samples.

|  | Sample A | Sample B | Sample C |
|---|---|---|---|
| Total yield of crystalline product (g.) | 167.0 | 121.5 | 126.5 |
| Pumping rate (g./min.) | 11.98 | 10.62 | 10.73 |
| Total contact time (min.) | 66.8 | 75.3 | 74.6 |
| Acetone in mother liquor, percent |  | 2.76 | 2.88 |
| Conversion of acetone, percent of theory | 51.6 | 42.8 | 45.2 |

Example 2

The conditions and procedures of Example 1 were repeated except for changes in the mol ratio of phenol to acetone and contact time. The following results were secured.

|  | I | II |
|---|---|---|
| Phenol-acetone, mol ratio | 6:1 | 12:1 |
| Temperature (° C.) | 75 | 75 |
| Total contact time (min.) | 40.2 | 40.0 |
| Conversion of acetone, percent of theory | 28.8 | 42.2 |

Example 3

The conditions and procedure of Example 1 were repeated except for changes in temperature of the column and contact time. The following results were secured.

|  | I | II | III |
|---|---|---|---|
| Temperature (° C.) | 65 | 75 | 85 |
| Total contact time (min.) | 20.1 | 20.0 | 20.1 |
| Conversion of acetone, percent of theory | 14.8 | 23.8 | 29.9 |

Example 4

The conditions and procedures of Example 1 were repeated except for changes in contact time. The following results were secured.

|  | I | II | III |
|---|---|---|---|
| Total contact time (min.) | 20.0 | 40.1 | 143.6 |
| Conversion of acetone, percent of theory | 23.8 | 28.6 | 55.3 |

Example 5

The conditions and procedure of Example 1 were repeated except for contact time and water content of the reaction mixture. The following results were secured.

|   | I | II | III |
|---|---|---|---|
| Total contact time (min.) | 20.0 | 20.0 | 20.0 |
| Percent H₂O in reaction mixture | 0.19 | 1.7 | 3.0 |
| Conversion of acetone, percent of theory | 23.8 | 14.7 | 0 |

*Example 6*

A batch 58 grams of acetone, 940 grams of phenol and 250 grams of dehydrated and treated catalyst (as described in Example 1) were stirred together at 75° C. for 5 hours. The catalyst was filtered off at approximately 70° C. and washed with approximately 500 grams of molten phenol. The filtrate and washings were combined and distilled at 200° C. at 0.25 mm. Hg. The residue, principally of 2,2-bis(4-hydroxyphenyl)propane, weighed 137 grams. This weight is equivalent to a 60 percent theoretical conversion of acetone to bisphenol-A.

*Example 7*

A mixture of 12 mols of phenol and 1 mol of acetophenone was passed through the equipment of Example 1 at 75° C. at such a rate as to have a contact time of 47 minutes. 5.6 percent of the acetophenone was converted to the bis-phenol (melting point 180° C.–184° C.).

*Example 8*

A mixture of 10 mols o-cresol and 1 mol of acetone was passed through the equipment of Example 1 at 75° C. at such a rate as to have a contact time of 41.5 minutes. 16.0 percent of the acetone was converted to the bisphenol of o-cresol.

*Example 9*

A batch, 5.45 grams of acetone, 94.55 grams of phenol and 47.7 grams of dehydrated and treated catalyst (prepared as described below) were stirred together at 95° C. for 1 hour. The catalyst was filtered off at approximately 70° C. The filtrate was dissolved in about 250 ml. of toluene and washed with water to remove some suspended catalyst particles. The washed toluene solution was distilled to 200° C. at 0.25 mm. Hg. The residue, principally of 2,2-bis(4-hydroxyphenyl)propane, weighed 8.5 grams. This weight is equivalent to a 37 percent theoretical conversion of acetone to bisphenol-A.

The catalyst was prepared by sulfonating insoluble poly-p-xylylene by the method described on page 13, vol. 13 (1954), of J. Pol. Sc., washing the sulfonated polymer free of acid with distilled water and dehydrating the water swollen polymer by azeotropic distillation of the water with phenol. The excess phenol was filtered leaving the catalyst ready for use as above.

*Example 10*

A batch, 49 grams of cyclohexanone, 643 grams of o-chlorophenol and 130 grams of catalyst (Dowex 50 X-4 dehydrated and saturated with o-chlorophenol) were stirred together at 75° C. for 17 hours. The catalyst was filtered off at approximately 70° C. The filtrate and washings were combined and distilled to 200° C. at 0.25 mm. Hg. The residue, principally 1,1-bis(4-hydroxy-3-chlorophenyl)cyclohexane weighed 30 grams. This weight is equivalent to a 20 percent theoretical conversion of cyclohexanone to the bisphenol.

What is claimed is:

1. A process for the production of bisphenols which includes the steps of contacting a mixture of a phenol having a reactive hydrogen para to the phenolic hydroxyl and a ketone having at least one methyl group alpha to the carbonyl, said mixture containing at least three molar parts of said phenol per molar part of said ketone, with a substantially insoluble cationic-exchange resin which has been treated so as to be substantially free of water, said contacting being at a temperature between about 40° C. and 150° C. for a time sufficient to form a bisphenol by the reaction of the said phenol with the said ketone, and thereafter recovering the bisphenol from the resulting mixture.

2. A process for the continuous preparation of 2,2-bis-(4-hydroxyphenyl)propane which includes the steps of continuously contacting a stream of phenol and acetone containing at least three moles of phenol per mole of acetone with a substantially insoluble cationic-exchanging polymeric resin which is substantially free of water and contains strong acid groups, said contacting being at a temperature between 65° C. and 95° C., thereafter separating the polymeric resin from the said stream and recovering the 2,2-bis(4-hydroxyphenyl)propane thus produced.

3. A process as in claim 2 wherein the strong acid groups are sulfonic acid groups.

References Cited by the Examiner

UNITED STATES PATENTS

| 2,468,982 | 5/1949 | Jansen | 260—619 |
| 2,494,758 | 1/1950 | Hartough et al. | 260—619 X |
| 2,498,656 | 2/1950 | De Groote et al. | |
| 2,515,906 | 7/1950 | Stevens et al. | 260—619 |
| 2,572,141 | 10/1951 | Harris | 260—619 X |
| 2,623,908 | 12/1952 | Stoesser et al. | 260—619 |
| 2,628,983 | 2/1953 | Aller et al. | 260—621 |

OTHER REFERENCES

"Amberlite Ion Exchange," p. 10 (1 page), pub. by Rohm & Haas, The Resinous Products Division, Washington Square, Philadelphia (September 1953).

Nachod et al., "Ion Exchange Technology," pages 273–279 (7 pages), pub. by Academic Press, Inc. (1956), New York.

Sussman, Ind. & Eng. Chem., vol. 38 (1946), pages 1228–30 (3 pages).

LEON ZITVER, *Primary Examiner.*

NATHAN MARMELSTEIN, CHARLES B. PARKER,
*Examiners.*